United States Patent
Bruning

(10) Patent No.: US 7,430,512 B2
(45) Date of Patent: Sep. 30, 2008

(54) METHOD AND SYSTEM FOR SELLING LIGHTING SOLUTIONS

(75) Inventor: Gert W. Bruning, Briarcliff Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1495 days.

(21) Appl. No.: 09/888,899

(22) Filed: Jun. 25, 2001

(65) Prior Publication Data

US 2002/0198728 A1 Dec. 26, 2002

(51) Int. Cl.
*G06Q 10/00* (2006.01)
*G01R 21/133* (2006.01)
(52) U.S. Cl. .......................... 705/1; 705/412
(58) Field of Classification Search .............. 705/1, 705/25, 27, 400, 412, 500; 702/40; 315/194, 315/291, 149, 151, 152, 169.3; 362/509, 362/800; 257/E25.022
See application file for complete search history.

(56) References Cited

U.S. PATENT DOCUMENTS

| | | | | |
|---|---|---|---|---|
| 4,225,808 A * | 9/1980 | Saraceni | ...................... | 315/307 |
| 4,475,064 A * | 10/1984 | Burgess | .................. | 315/227 R |
| 5,150,016 A * | 9/1992 | Sawase et al. | ................ | 315/294 |
| 5,636,303 A * | 6/1997 | Che et al. | ...................... | 385/33 |
| 5,754,036 A * | 5/1998 | Walker | ....................... | 323/237 |
| 5,783,909 A * | 7/1998 | Hochstein | .................... | 315/159 |
| 5,803,579 A * | 9/1998 | Turnbull et al. | ............. | 362/516 |
| 6,056,420 A * | 5/2000 | Wilson et al. | ................ | 362/249 |
| 6,211,626 B1 * | 4/2001 | Lys et al. | ..................... | 315/291 |
| 6,535,859 B1 * | 3/2003 | Yablonowski et al. | ........ | 705/412 |

\* cited by examiner

*Primary Examiner*—Igor N. Borissov

(57) ABSTRACT

A method for selling lighting solutions includes installing a lighting system and measuring the amount of lumens emitted and/or measuring the changes in light spectrum. The method also includes determining a fee based on the amount of lumens emitted and the changes in light spectrum. The fee may also be calculated based on the services rendered for the installation and the maintenance of the lighting system. A lighting solutions system may include means for measuring the light output and means for determining a fee based on the light output. The lighting solutions system may also include means to allow the customer control of the lighting solutions system.

13 Claims, 3 Drawing Sheets

METHOD AND SYSTEM FOR SELLING LIGHTING SOLUTIONS

TECHNICAL FIELD

The present invention relates to lighting systems. More particularly, the invention relates to a method for selling lighting solutions that includes the installation and maintenance of lighting systems geared towards the unique needs of an individual consumer or business. In addition, the method includes charging a fee for the production of light and the servicing of the lighting system.

BACKGROUND OF THE INVENTION

In conventional lighting of a residence or business the consumer purchases and installs the light fixtures and light bulbs. Except for the occasional purchase of a replacement bulb or fixture the lighting of the individual residence or business remains the same as when the lighting fixture was first installed. This arrangement offers very little in the way of flexibility in the lighting of an individual space, home or business. Aside from the installation of a dimmer or brighter light bulb or a dimmer switch, the consumer has few options when trying to change the atmosphere in a room to suit a particular need.

It would be desirable therefore to have a lighting solutions system that is more flexible thereby allowing the consumer the ability to change the lighting to suit the current circumstance or desire.

It would also be desirable to provide a method of providing a light system whereby a lighting solution system is installed and maintained by a provider of lighting systems. The provider would install a lighting system that would suit the needs of the consumer and maintain the lighting system. The provider may then periodically bill the consumer for the lighting system installed, the services provided and the total amount of light emitted from the lighting system.

In the present invention, the consumer would have many options in the lighting system installed in the home or business due to the flexibility of the system over that which is currently known in the art.

SUMMARY OF THE INVENTION

One aspect of the invention provides a method for selling lighting solutions including installing a lighting system within a building, measuring the lumens generated from the lighting system and determining a fee based on the amount of lumens generated. The method may include installing a lighting system containing at least one LED. One aspect of the invention includes using a photosensor or photodiode to measure the lumens generated by the lighting system. Additionally, an input device may be installed to allow customers control of the lighting system.

Another aspect of the present invention provides a method that includes measuring changes of the light spectrum generated by the lighting system and determining a fee based on these changes. This method may include an input device that allows customer control of the lighting system. The input device may also allow customer the ability to access and use preprogrammed patterns of light. The use of these preprogrammed patterns of light may be measured and a fee may be determined based on the use of the patterns of light.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DESCRIPTION OF THE PREFERRED EMBODIMENT

Figure 1:
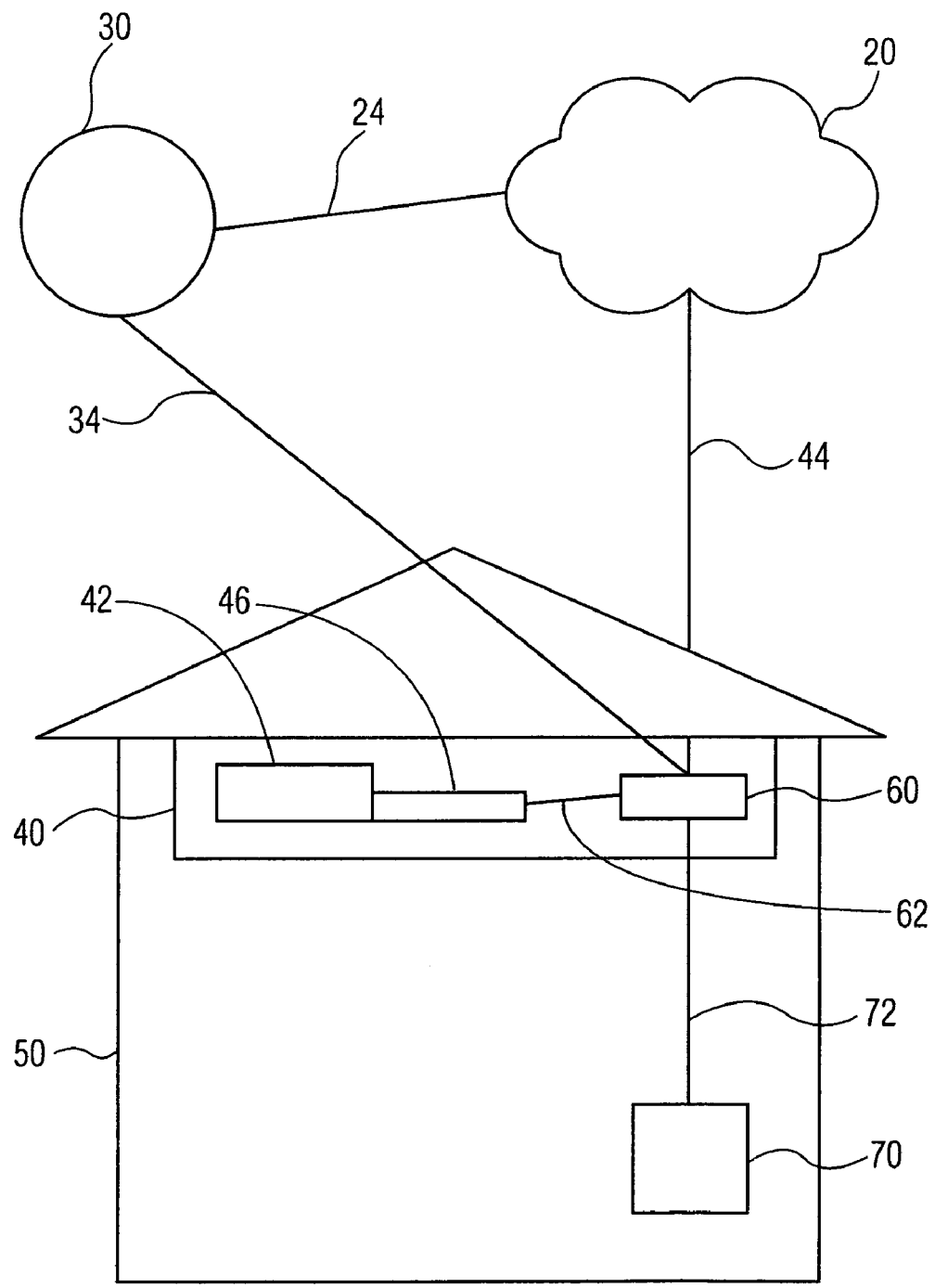
FIG. 1 is a schematic diagram illustrating one embodiment of a lighting solution system in accordance with the present invention.

Referring to FIG. 1, one embodiment of a lighting solution system 10 is generally shown for use in building 50.

A lighting system 40 may be installed in building 50. The lighting system 40 may contain a light source 42. The light source 42 may include light emitting devices such as white LED, color LED, fluorescent light or the like. The lighting system 40 may include light measuring device 46 suitably connected to the light source 42. The connection (not shown) between light source 42 and light measuring device 46 may be an optic fiber or any other suitable connection known in the art. The light measuring device 46 may be a photodiode, a photomultiplier tube array or any other suitable light measuring device known in the art.

The lighting system 40 may include a monitoring device 60. The monitoring device 60 may be any suitable hardware or software, or combination of hardware and software that is configured to collect data from the light measuring device 46. The monitoring device 60 communicates with light measuring device 60 through connection 62. Connection 62 may be any suitable connection that transmits data collected by the light measuring device 46. The monitoring device 46 may store the data collected from the light measuring device 46. The data may be stored using RAM or other suitable means to store data known in the art.

The data collected by the monitoring device 60 may be transmitted to a server 30. The server 30 may be any suitable hardware or software, or combination of hardware and software that is configured to collect data from the monitoring device 60. In one embodiment, the data is transmitted to the server 30 indirectly via the Internet 20 by connections 24 and 44. Connections 24 and 44 may be any suitable means such as telephone lines, DSL cable, wireless technology or any other means of data transmission known in the art. In another embodiment, the data collected by the monitoring device 60 may be transmitted directly to the server 30 via connection 34. Connection 34 may be any suitable means such as telephone lines, DSL cable, wireless technology or any other means of data transmission known in the art. The data gathered by the server 30 may then be used to calculate the fee owed by the consumer for the use of the lighting solution system 10.

The consumer may affect the output of the light system 40 through an input device 70. The input device 70 may be any suitable hardware or software, or combination of hardware and software that is configured to enable the consumer to change the light output of the lighting system 40. The input device 70 may include a personal computer, wall mounted control panel, a hand held wireless device or any other suitable means known in the art. The input device 70 may engage the lighting system 40 by connection 72. Connection 72 may be computer cable, telephone wire, wireless technology or any other means known in the art.

Figure 2:
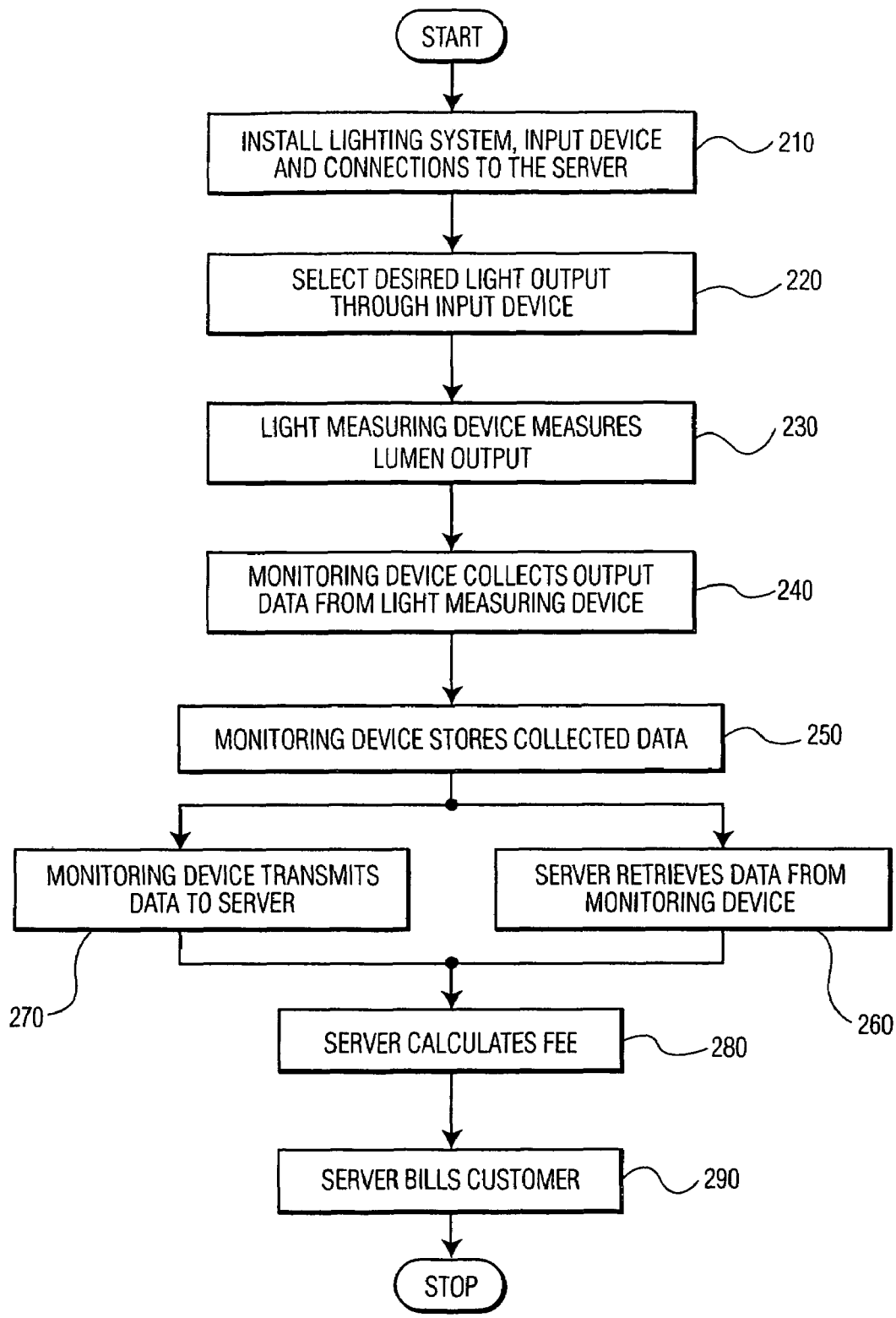
FIG. 2 illustrates a flow diagram for one embodiment of a method to provide a light solutions system.
Figure 3:
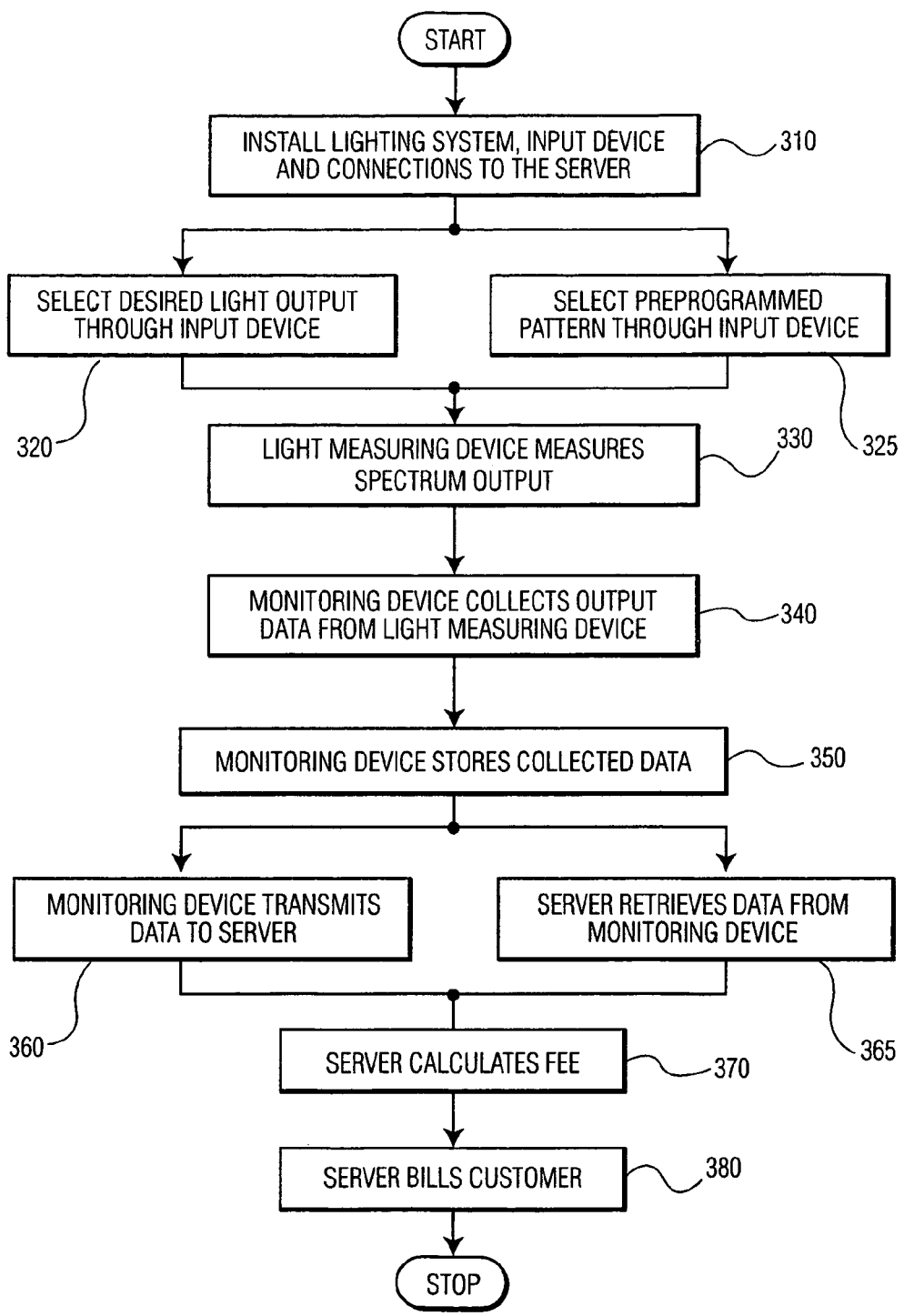
FIG. 3 illustrates a flow diagram for one embodiment of a method to provide a light solutions system.

Referring now to FIG. 2 and FIG. 3, in practice, a light system 40, input device 70 and suitable connections are installed in the building (Block 210, 310). The light system 40 may be designed to meet the particular needs of the individual consumer allowing for flexibility of the system to meet future needs of the user. The light system 40 may include a plurality of light sources 42. The light sources 42 may include fluorescent light, white LED, color LED, or any other type of light source known in the art.

Once the lighting system 40 is installed, the user may control the lighting system 40 using the input device 70. With the input device 70 the user may adjust the current lighting by selecting the type of light output desired (Block 220, 320). Alternatively, the user may choose a pattern of light to be emitted from a preprogrammed selection (Block 325).

For example, if the user wanted warm white light to light a space for entertaining the lighting system could be instructed by the user via the input device 70 to actuate white LED and red LED to produce the warm white tone desired. On the other hand, if the user wanted to light the space with bright white light for a business meeting the user could instruct the system to actuate white LED and blue LED to provide a bright white light. A lighting system with a plurality of colored LED and white LED may be configured to provide a flexible lighting system to suit many lighting needs of the user.

Another configuration of the lighting system may be used to treat seasonal affective disorder. Users with this disorder who must undergo light therapy currently must resort to having two separate lighting systems, one system to provide light for ordinary lighting purposes and another system to provide the light therapy. With the current invention, the system may be instructed to provide the light therapy as needed using the appropriate light sources and, once the light therapy is completed, the same system may then be instructed to provide the appropriate lighting for normal use of the space.

The lighting system 40 may also be configured to provide a sunrise simulator. Sunrise simulators are used to treat depression and other disorders related to the lack of sunlight. Sunrise simulators are frequently used in geographical locations close to the poles of the Earth during the time of year when the sun does not rise. Sunrise simulators are also used by individuals to awake during the night to go to work.

Another configuration of lighting system 40 may provide the user the ability to select from input device 70 a preprogrammed pattern of light to illuminate a wall, floor, room or combination of these (Block 325). The input device may be configured to provide an unlimited number of patterns. Such patterns may be as simple as various geometric shapes and random ever changing patterns or may be as complicated as reproductions of works of art.

Once the lighting system 40 is installed, the amount of light emitted from the various light sources 42 may be measured by the light measuring devices 46. The light measuring devices may be configured to measure the lumen output of white light emitting light sources (Block 230). The light-measuring device may also be configured to measure the spectrum changes of light sources that change color (Block 330). The light-measuring device may be configured to take measurements at various times. The light-measuring device 46 may be configured to take constant measurements of light output. Alternatively, measurements may be taken at predetermined intervals of time, for example every 10 seconds or every minute. Additionally, a measurement may be taken every time that the monitoring device detects a change in pattern or change in spectrum.

The monitoring device 60 may collect the data from the light measuring devices 46 regarding the light output (Block 240, 340). The data may be stored by the monitoring device 60 using any suitable data storage device such as a computer chip with RAM capabilities (Block 250, 350). Data collected and stored by the monitoring device 60 may be transmitted to the server 30 by any suitable means (Block 270, 360). For example, the monitoring device 60 may open a connection to the server 30 periodically to send the data to the server 30. Alternatively, there may be a connection to the server 30 that allows a constant stream of data to be sent from the monitoring device 60. In another embodiment, the server 30 may retrieve the data stored by the monitoring device 60 using any suitable means (Block 260, 365). For example, data may be accessed by the server 30 by a periodic dial up to the monitor device 60 through a telephone line connection, a DSL cable, or the like. In another embodiment, the lighting system user may manually send the data collected and stored by the monitoring device 60 to the server 30. For example, the user may instruct the input device 70 to open a connection to the server 30 and to then send the data to the server 30.

Based on the data received by the server 30, a fee would be calculated for the use of the lighting system (Block 280, 370). Software running on the server 30 would calculate the fee based on numerous factors. Such factors may include the total amount of lumens emitted from the light sources, the number of times the spectrum of light changed, and the number of times the user selected a preprogrammed pattern of light. The fee may also reflect a usage fee for the lighting system, input devices and other hardware that may be leased from the system provider. Alternatively, the server 30 may calculate a flat fee for the total amount of light emitted and for the use of the lighting system. Other suitable fee structures for light usage can be envisioned such as charging a flat fee for a predetermined limit of total lumens emitted, with an additional fee for usage beyond that limit, or charging a set fee for the use of the preprogrammed patterns of light.

Once the software on the server calculates the appropriate fee, the user would be billed by the server (Block 290, 380).

As described above, the lighting solution system 10 provides a number of advantages, some of which have been described above and others of which are inherent in the invention. Also, modifications may be proposed without departing from the teachings herein. Accordingly, the scope of the invention is only to be limited as necessitated by the accompanying claims.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method for selling lighting solutions comprising:
   installing a lighting system for a customer;
   measuring lumens generated from the lighting system; and
   determining a customers light usage fee based on the lumens.

2. The method of claim 1 wherein the lighting system comprises at least one LED.

3. The method of claim 1 wherein the measuring of the lumens generated by the lighting system comprises measuring the lumens by at least one photodiode.

4. The method of claim 1 further comprising:

installing an input device to allow customer control of the lighting system.

5. The method of claim 1 further comprising:

measuring changes of light spectrum generated by the lighting system;

determining a customers light usage fee based on the changes of light spectrum; and installing an input device to allow customer control of the lighting system.

6. A method for selling lighting solutions comprising:

installing a lighting system for a customer;

measuring changes of light spectrum generated by the lighting system; and determining a customers light usage fee based on the changes of light spectrum.

7. The method of claim 6 wherein the lighting system comprises at least one LED.

8. The method of claim 6 wherein the measuring of the changes of light spectrum generated by the lighting system comprises measuring the changes of light spectrum by a photodiode.

9. The method of claim 6 further comprising:

installing an input device to allow customer control of the lighting system.

10. A lighting solutions system comprising:

means for measuring lumen output of a lighting system; and means for determining a fee based on the lumen output.

11. The lighting solutions system of claim 10 further comprising:

means to allow customer control of the lighting system.

12. The lighting solutions system of claim 11 further comprising:

means for measuring changes in spectrum of the lighting system; and means for determining a fee based on changes in spectrum.

13. The lighting solutions system of claim 12 further comprising:

means for selecting a preprogrammed pattern of light to be emitted from the lighting system;

means for measuring the use of the preprogrammed patterns of light; and means for determining a fee based on the use of the preprogrammed patterns of light.

* * * * *